(12) United States Patent
Sabella

(10) Patent No.: US 6,703,096 B2
(45) Date of Patent: Mar. 9, 2004

(54) COMBINATION SHEET PAD

(75) Inventor: Robert J. Sabella, Syracuse, NY (US)

(73) Assignee: PCI Paper Conversions, Inc., Syracuse, NY (US)

( * ) Notice: Subject to any disclaimer, the term of this patent is extended or adjusted under 35 U.S.C. 154(b) by 0 days.

(21) Appl. No.: 10/196,589

(22) Filed: Jul. 16, 2002

(65) Prior Publication Data
US 2004/0013837 A1 Jan. 22, 2004

(51) Int. Cl.⁷ .............................................. B42D 15/00
(52) U.S. Cl. ..................... 428/40.1; 283/35; 283/36; 283/81; 428/41.9; 428/42.1; 428/192; 428/194
(58) Field of Search ................ 428/401, 41.9, 428/42.1, 192, 194; 283/81, 35, 36

(56) References Cited

U.S. PATENT DOCUMENTS

| | | |
|---|---|---|
| 3,744,435 A | 7/1973 | Tracy et al. |
| 3,857,731 A | 12/1974 | Merrill, Jr. et al. |
| 4,590,109 A | 5/1986 | Holmberg |
| 4,678,206 A * | 7/1987 | Leahan .................. 281/15 |
| 4,822,074 A | 4/1989 | Hueffman et al. |
| 4,882,211 A | 11/1989 | McIntyre et al. |
| 4,995,641 A | 2/1991 | Landry et al. |
| 5,282,649 A | 2/1994 | Williams et al. |
| 5,299,833 A | 4/1994 | Madole, Jr. |
| 5,318,476 A | 6/1994 | Haskayne et al. |
| 5,366,776 A * | 11/1994 | Mertens ..................... 428/40 |
| 5,390,819 A | 2/1995 | Kaye |
| 5,413,381 A | 5/1995 | Beeuwkes, III et al. |
| 5,464,672 A * | 11/1995 | Jackson ..................... 428/40 |
| 5,641,550 A | 6/1997 | Berman et al. |
| 5,965,225 A | 10/1999 | Torres |
| RE36,601 E | 3/2000 | Woods et al. |
| 6,071,584 A | 6/2000 | Ritter |
| 6,231,712 B1 | 5/2001 | Torres |

* cited by examiner

*Primary Examiner*—Nasser Ahmad
(74) *Attorney, Agent, or Firm*—Michael P. Williams; Bond, Schoeneck & King, PLLC

(57) ABSTRACT

An article of manufacture includes a first pad of sheets with a plurality of layers where the first pad of sheets perimeter is defined by a first edge, a second edge, a third edge and a fourth edge. The article of manufacture further includes a second pad of sheets with a plurality of layers where the second pad of sheets perimeter is defined by a fifth edge, a sixth edge, a seventh edge and an eighth edge. The first and second pad of sheets are releasably bonded together at the first edge of the first pad of sheets and at the fifth edge of the second pad of sheets by a first adhesive. The first adhesive forms a hinge structure allowing the first pad of sheets and second pad of sheets to rotate about an axis. The second pad of sheets are releasably bonded together at a portion of the bottom side of each layer of the second pad of sheets located at the fifth edge by a second adhesive. The remaining portion of the bottom side of each layer of the second pad of sheets is free of the second adhesive. Finally, the second adhesive has a peel strength less than the first adhesive.

15 Claims, 1 Drawing Sheet

COMBINATION SHEET PAD

FIELD OF THE INVENTION

This invention relates to an improved article of manufacture and the method of manufacturing the same, and more particularly to a combination sheet pad that may be used as a note pad or the like.

BACKGROUND OF THE INVENTION

Sheet pads for making notes are known to the practitioner in the art that are square, rectangular, or variously shaped in cross-section and consist of a variety of sheets stacked one on top of the other forming a selected shape. The sheets are held together in the pad, for example, by gluing their rear edges in the pad and bonding the edges together. The result is that one or more sheets are removable from the pad by tearing the sheet away from the bonding.

A different type of sheet pad includes a pad of sheets having a coating applied to each sheet layer on its rear side with a strip of releasable pressure-sensitive adhesive usually placed parallel to the edge of the sheet. This is known in the art as an attachment strip or a ribbon of adhesive. The sheet is removable from the pad by pulling off a sheet from the sheets lying thereunder in the pad. The sheet or sheets then detachably stick onto another surface such as a desktop, computer monitor, or bulletin board. This type of sheet pad comprises individual sheets each containing a pressure-sensitive adhesive and each sheet may also further comprise a release coating provided on its upper side. The release coating acts as a release aid for the adhesive on the previous sheet's underside.

Heretofore the consumer of note pads was faced with the choice of which type of sheet pad to use, the type that contains self-adhesive pressure sensitive adhesive allowing it to stick to surfaces or the type that merely comprises sheets of paper joined together and do not use adhesive. In order to avoid the choice of which type of sheet pad to use, the consumer could opt to have both types of pads available. However, the consumer is then faced with multiple pads taking up additional space on a sometimes already cluttered desktop.

There is a need for a combination pad of sheets that consists of releasable bound sheets that includes both sheets with attachment strips and sheets without attachment strips. Additionally, the advertising industry long ago discovered sheet pads as a preferred medium of advertising by including an advertising imprint close to the front edge of the sheet or along the pad edge. What is further needed is a combination sheet pad that provides printed advertisements that creatively utilize the symmetrical nature of the combination pad.

SUMMARY OF THE INVENTION

It is an aspect of this invention to provide a sheet pad that combines releasable bonded sheets, a portion of those sheets having attachment strips.

It is another aspect of this invention to provide a combination sheet pad that provides for printed matter to be displayed in various orientations.

To accomplish these and other aspects of the invention an article of manufacture includes a first pad of sheets with a plurality of layers where the first pad of sheets perimeter is defined by a first edge, a second edge, a third edge and a fourth edge. The article of manufacture further includes a second pad of sheets with a plurality of layers where the second pad of sheets perimeter is defined by a fifth edge, a sixth edge, a seventh edge and an eighth edge. The first and second pad of sheets are attached at the first edge of the first pad of sheets and at the fifth edge of the second pad of sheets by a hinge structure. The hinge structure allows the first pad of sheets and second pad of sheets to rotate about an axis. The second pad of sheets are releasably bonded together at a position on the bottom side of each layer of the second pad of sheets. The remaining portion of the bottom side of each layer of the second pad of sheets is free of the second adhesive.

DETAILED DESCRIPTION OF THE INVENTION

Figure 1:
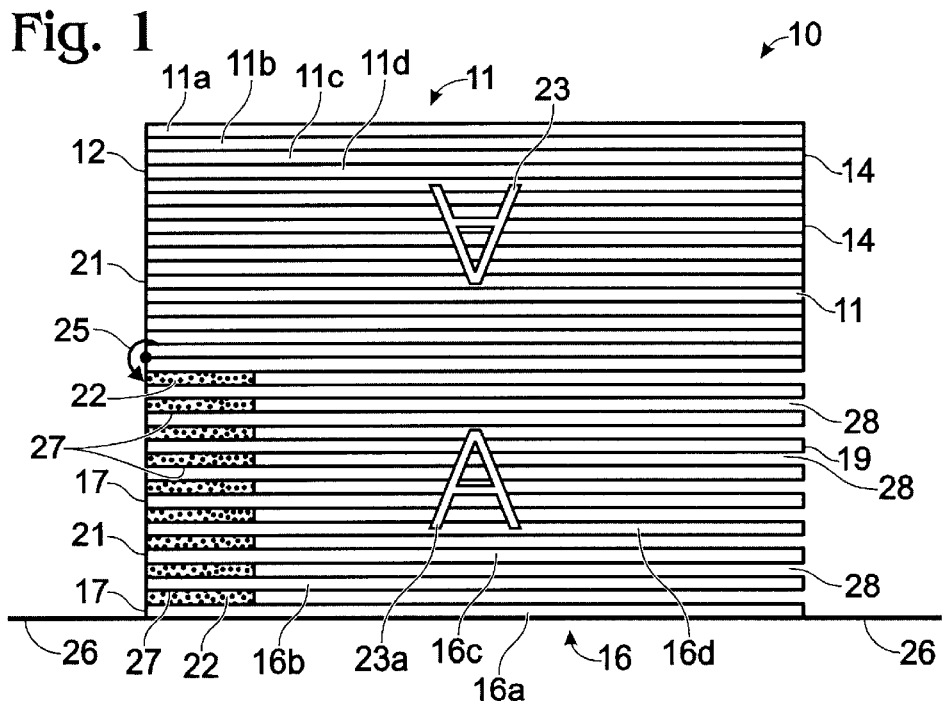
FIG. 1 is a cross-sectional view of the preferred embodiment of the invention.
Figure 2:
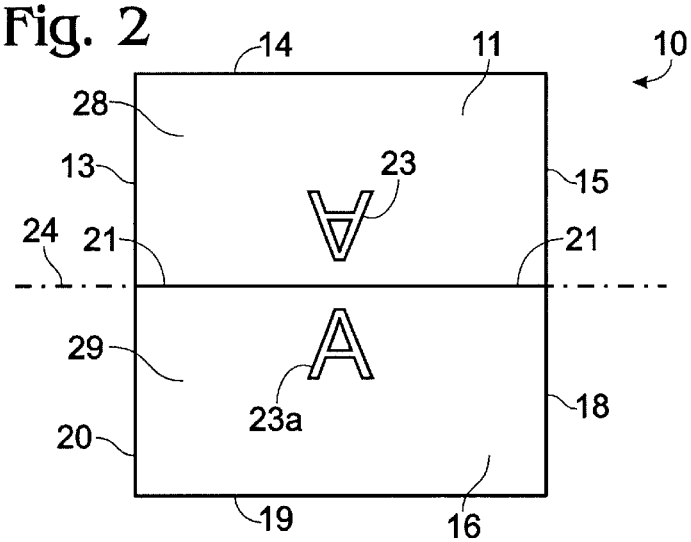
FIG. 2 is a top view of the preferred embodiment of the invention shown in an open position.

FIG. 1 shows a combination sheet pad that embodies the present invention. The article 10 is shown in a cross-section view. The article 10 is a combination sheet pad that includes a first pad of sheets 11 with a plurality of layers 11a, 11b, 11c, 11d and so forth. The article 10 further includes a second pad of sheets 16 with a plurality of layers 16a, 16b, 16c, 16d and so forth. Referring now to FIGS. 1 and 2, the first pad of sheets 11 perimeter is defined by a first edge 12, a second edge 13, a third edge 14 and fourth edge 15. The second pad of sheets 16 perimeter is defined by a fifth edge 17, a sixth edge 18, a seventh edge 19 and an eighth edge 20. The sheet layer perimeter dimension varies depending on the application. For example, a sheet layer varies in size from about 8.5" by 11.0" in dimension, that is the size of regular printing paper, to about ¾" by ½" in dimension, which is the size of a small note. Furthermore the rectangular perimeter of the sheets is substitutable by any desired shape including square, circular, oval, trapezoidal and other arcuate shapes.

A first adhesive 21 releasably bonds together all the layers in the first pad of sheets 11 and all the layers in the second pad of sheets 16. The first adhesive 21 bonds all of the layers on the first edge 12 of the first pad of sheets 11 and all of the layers on the fifth edge 17 of the second pad of sheets 16. The first adhesive 21 is typically an acrylate copolymer adhesive and is preferably one that does not harm the surface to which it is applied. The thickness of the first adhesive 21 varies depending on the application and the desired bond strength. Also, the first adhesive 21 has a high modulus of elasticity and is applied thick enough to allow the first adhesive 21 to form a hinge structure when applied to the first edge 12 and the fifth edge 17. This allows the first pad of sheets 11 to be bent back and rotate about an axis 24, wherein the outside portion of the first layer 11a touches the plane 26 along with the outside portion of the first layer 16a of the second pad of sheets 16. Alternately, the second pad of sheets 16 is rotatable around axis 24 because adhesive 21 forms a hinge structure. Furthermore, there can be placement of an internal hinge structure (not shown) within either the first pad of sheets 11 and/or the second pad of sheets 16. This internal hinge structure would divide the first pad 11 into two or more separate smaller pads and/or the second pad 16 into two or more separate smaller pads. As is understood by the practitioner of the art, the combination note pad can also include several internal hinge structures allowing the note pad to open in different directions.

The second pad of sheets 16 is releasably bonded together by a second adhesive 22 that is sticky and applied at a first position 27 over the bottom side of the first layer 16a, the second layer 16b, the third layer 16c and so forth as there are as many layers. This particular application is known in the art as an attachment strip or ribbon of adhesive. The thickness of the second adhesive, and consequently gap 28, is small and a thin film in the range that will not effect bond strength of the first adhesive 21. The second adhesive 22 is applied over the bottom side of each layer at and parallel to the fifth edge 17. The remaining portion of the bottom side of each layer is free of the second adhesive 22. The portion of the bottom side of each layer of the second pad of sheets 16 where the second adhesive 22 is applied is about ¼ of the distance between the fifth edge 17 and the seventh edge 19. This portion varies depending on the dimension of the layers and the thickness of the layers in the second pad of sheets 16.

The second adhesive 22 is an acrylate ester microsphere structure or monomers which are oleophilic, water-emulsifiable, substantially water-insoluble and as homopolymers have a glass transmission temperature below about 20° C. However, any sticky adhesive that does not harm the surface to which it is applied is contemplated for use in this invention. This includes pressure-sensitive adhesives that are dry in form, are permanently tacky at room temperature and adhere without need for more than finger or hand pressure. The second adhesive 22 preferably has a peel strength low enough so not to effect the bond strength of the first adhesive 21. Furthermore, the second adhesive 22 is an adhesive that retains sufficient peel strength after multiple release and re-bonding to maintain bonding with the second pad of sheets 16 layers over the life of the article 10.

Figure 3:
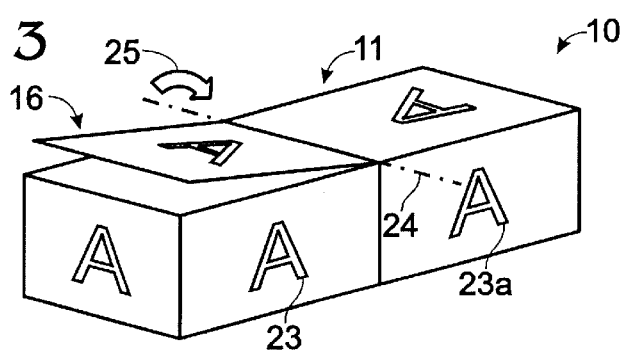
FIG. 3 is an isometric view of the preferred embodiment of the invention shown in an open position.

The first pad of sheets 11 first edge 12, second edge 13, third edge 14 and fifth edge 15 have a first print design 23 as illustrated in FIG. 1 and FIG. 2. The second pad of sheets 16, fifth edge 17, sixth edge 18, seventh edge 19 and eighth edge 20 have a second print design 23*a*. A first print design 23, for example, is invertedly printed to a second print design 23*a* when the first pad of sheets 11 is not rotated and article 10 is in the closed position. A second print design 23*a*, for example, is uprightly printed to a first print design 23 when the first pad of sheets 11 is not rotated and article 10 is in the closed position. As can be seen in FIG. 3, when the first pad of sheets 11 is rotated 25 about axis 24 in the open position the printed design 23 is provided in a similarly oriented position as the printed design 23*a* on the second pad of sheets 16. As is known by the practitioner in the art the design on the edges of the first pad of sheets 11 and the second pad of sheets 16 varies either alone or in combination with one another and a variety of designs are useable. Alternatively the first design 23 and the second design 23*a* do not need to be printed invertedly and uprightly, but take any desired orientation depending on the application. This includes, but is not limited to slanted printing, parallel printing and the like. Furthermore, the color of the second pad of sheets 16 and the first pad of sheets 11 varies either alone or in combination with one another and a variety of colors are useable. Also the color of each side of the individual sheets varies depending on the application.

The article 10 shown in FIG. 1 is constructed out of various materials including, but not limited to paper and plastic. This includes plain paper, coated paper, low-strength paper, medium-strength paper, high-strength paper, bond paper, newsprint, liner-board paper, bleached paperboard and various types of plastics. The plastics are typically a thin sheet of film that are either transparent, solid or opaque but accepts writing from pens, pencils and the like. The first pad of sheets 11 and the second pad of sheets 16 material is typically different, but can also be constructed of the same material. For example, in the preferred embodiment of the invention the first pad of sheets 11 is comprised of plain paper while the second pad of sheets 16 is comprised of a coated paper. Depending on the paper or plastic material used, the thickness of the individual layers varies in both the first pad of sheets 11 and the second pad of sheets 16.

In FIG. 2, the article 10 is in the open position, that is, the second pad of sheets 16 are positioned in the same plane. The second pad of sheets has already been rotated about axis 24 exposing the first side 28 of a layer of the first pad of sheets 11 and the second side 29 of a layer of the second pad of sheets 16. A first design 23 is printed in a first orientation on the first side 28 of every layer of the first pad of sheets 11. This design varies as desired along with the printed surface, for example, embossing the design onto the top layer. A second design 23*a* is printed in a second orientation, opposite in orientation from the print on the first pad of sheets, on the second side 29 of every layer of the second pad of sheets 16. This design also varies as desired along with the printed surface, for example, a raised surface design. The designs on the first side 28 and the second side 29 are typically one type of print, but the one type of print is substitutable for a combination of two types of print. For example, the first and second pad of sheets has an embossed design, or the first pad of sheets has an embossed design and the second pad of sheets has a raised surface design. Alternatively, the first design 23 and the second design 23*a*, opposite orientation, are substitutable for a similar orientation, a reversing of the first and second orientation or combination thereof. Consequently, any combination design is possible.

As the first pad of sheets 11 is rotated open about axis 24, the first pad of sheets 11 first oriented design 23 is similarly oriented with the second oriented design 23*a* on the second pad of sheets 16. Each design provides for a unique pad that combines bound sheets of paper with and without attachment strips or ribbons of adhesive. As can be seen in FIG. 3, individual layers of the second pad of sheets 16 are torn off independently from the individual layers of the first pad of sheets 11.

Again referring to FIG. 2, the article 10 is in the open position. The first adhesive 21 that is releasably bonded to the first edge 12 and the fifth edge 17 acts as a hinge as the first pad of sheets is rotated open about axis 24. In the open position the first edge 12 touches the fifth edge 17. The first pad of sheets 11 is rotatable about axis 24 without changing the position of the layers of the second pad of sheets 16. Likewise, if the position of article 10 is inverted the second pad of sheets 16 is rotatable about axis 24 without changing the position of the layers of the first pad of sheets 11.

The method of manufacturing the article 10 is a process that forms the article 10 as shown in FIGS. 1 through 3. A first sheet forming material (not shown), typically coated paper from a roll, passes between a gravure cylinder applying a second adhesive at predetermined intervals to the surface on one side of the first sheet forming material. Another cylinder, typically a rubber impression cylinder, on the opposite side of the first sheet forming material, will print a design on the first sheet forming material at predetermined intervals. Next, the first sheet forming material enters a drying tunnel to dry the material. The first sheet forming material is transferred to a slitter and a die cutter, cutting the first sheet forming material into individual pieces that will make the layers of the second pad of sheets 16. As is understood by the practitioner of the art, there exist many methods to apply adhesive including web-coatings and sheet-coatings Furthermore, the design is printed on the sheet through the method of off-set printing.

A second sheet forming material (not shown), typically plain paper from a roll, passes between a cylinder. This cylinder is typically a rubber impression roll. On one side of the second sheet forming material the rubber impression roll prints a design at a predetermined interval. Next, the second sheet forming material enters a drying tunnel to dry the material. The second sheet forming material is transferred to a slitter and a die cutter, cutting the second sheet forming material into individual pieces that will make the layers of the first pad of sheets 11.

The individual layers making up the first and second pad of sheets are transferred to individual stackers that will count a predetermined number of layers. Once the counted layers have been stacked a thin film first coat of the first adhesive 22 is applied to the first edge 12 and fifth edge 17. This individually occurs for the layers that make up the first and second pad of sheets. Next, the first pad of sheets 11 is properly oriented to the second pad of sheets 16 and stacked upon the second pad of sheets 16. The orientation (alignment) includes making sure the design is properly positioned for the desired final article 10. Also, the first adhesive 21 on the first edge 12 of the first pad of sheets ge and the first adhesive 21 on the fifth edge 17 of the second pad of sheets 16 are aligned. Finally, a second coat of the first adhesive 21 is applied to both the first pad of sheets 11 and the second pad of sheets 16 providing the hinge structure on the first edge 12 and the fifth edge 17.

A first design is printed on the edges of the first pad of sheets 11 which includes the first edge 12, the second edge 13, the third edge 14 and the fourth edge 15. The first design is invertedly printed for the purpose of similar orientation to the second design that is uprightly printed on the edges of the second set of sheets 16 when the first pad of sheets 11 is rotated about axis 24 to an open position. The second design is printed on the edges of the second pad of sheets 16 which includes the fifth edge 17, the sixth edge 18, the seven th edge 19 and the eighth edge 20. As is understood by the practitioner of the art the design is substitutable for a second design, third design and so forth for a variety of different designs that are desired. Furthermore, the first design and the second design inverted and upright design is substitutable for a design that is similarly oriented when printing yet reversibly oriented when the first pad of sheets 11 and the second pad of sheets 16 are rotated 24 into an open position.

There are also various other methods to manufacture the combination sheet pad as is understood by the practitioner of the art. One method involves printing on a web in a continuous roll-to-roll manufacturing, wherein a pattern is formed into the sheet through coating. Another method involves coating the adhesive on the sheet roll-to-roll, printing on the roll and then forming the sheet. Yet another method involves printing sheet-to-sheet and then coating the sheeted paper. Still yet another method involves printing roll-to roll, coating roll-to-roll and then printing roll-to-sheet.

While there has been illustrated and described what is at the present considered to be a preferred embodiment of the invention, it should be appreciated that numerous changes and modifications are likely to occur to those skilled in the art. It is intended in the appended claims to cover all those changes and modifications that fall within the spirit and scope of the present invention.

What is claimed:

1. An article of manufacture comprising:
   a) a first pad of sheets with a plurality of layers, said first pad comprising a first edge, a second edge, a third edge and a fourth edge for defining the perimeter of said first pad of sheets;
   b) a second pad of sheets with a plurality of layers, said second pad comprising a fifth edge, a sixth edge, a seventh edge and an eighth edge for defining the perimeter of said second pad of sheets;
   c) said first pad of sheets and said second pad of sheets are bonded together at said first edge and fifth edge by a first adhesive wherein said first adhesive forms a hinge structure allowing said first pad of sheets and said second pad of sheets to rotate about an axis;
   d) said second pad of sheets is bonded together by a second adhesive applied over a portion of the bottom side of each layer of said second pad of sheets located at said fifth edge with the remainder of said bottom side of each layer being free of said second adhesive; and
   e) said first pad of sheets is devoid of said second adhesive.

2. The article of manufacture as claimed in claim 1, wherein said perimeter of said first pad of sheets is a plurality of arcuate shapes.

3. The article of manufacture as claimed in claim 1, wherein said perimeter of said second pad of sheets is a plurality of arcuate shapes.

4. The article of manufacture as claimed in claim 1, wherein said first, second, third, fourth, fifth, sixth, seventh and eighth edges are printed with a plurality of designs.

5. The article of manufacture as claimed in claim 4, wherein said designs are a plurality of colors.

6. The article of manufacture as claimed in claim 1, wherein the peel strength of said second adhesive is low enough not to effect of the bond strength of said first adhesive.

7. The article of manufacture as claimed in claim 1, wherein said first and second pad of sheets are material selected from the group consisting of plain paper, coated paper, low-strength paper, medium-strength paper, high-strength paper, bonded paper, newsprint, liner board paper, bleached paper board and plastic.

8. The article of manufacture as claimed in claim 1, wherein said layers of said first pad of sheets have a plurality of printed surfaces.

9. The article of manufacture as claimed in claim 1, wherein said layers of said second pad of sheets have a plurality of printed surfaces.

10. The article of manufacture as claimed in claim 1, wherein said layers of said first pad of sheets have a plurality of colored surfaces.

11. The article of manufacture as claimed in claim 1, wherein said layers of said second pad of sheets have a plurality of colored surfaces.

12. The article of manufacture as claimed in claim 1, wherein said layers of said first pad of sheets rotate around an axis without changing the position of said layers of said second pad of sheets.

13. The article of manufacture as claimed in claim 1, wherein said layers of said second pad of sheets rotate around an axis without changing the position of said layers of said first pad of sheets.

14. The article of manufacture as claimed in claim 1, wherein said first, second, third and fourth edge of said first pad of sheets are printed with a first design and said fifth, sixth, seventh and eighth edge of said second pad of sheets are printed with a second design for providing a unique pad.

15. The article of manufacture as claimed in claim 1, wherein said first and second pad of sheets are a plurality of different colors.

* * * * *